(12) United States Patent
Achilli

(10) Patent No.: US 11,517,151 B2
(45) Date of Patent: Dec. 6, 2022

(54) HEAT RESISTANT COOKING APPARATUS

(71) Applicant: Sam J. Achilli, Lake Geneva, WI (US)

(72) Inventor: Sam J. Achilli, Lake Geneva, WI (US)

( * ) Notice: Subject to any disclaimer, the term of this patent is extended or adjusted under 35 U.S.C. 154(b) by 47 days.

(21) Appl. No.: 17/176,441

(22) Filed: Feb. 16, 2021

(65) Prior Publication Data
US 2022/0125247 A1  Apr. 28, 2022

Related U.S. Application Data

(60) Provisional application No. 63/204,822, filed on Oct. 27, 2020.

(51) Int. Cl.
*A47J 43/28* (2006.01)
*A47G 21/02* (2006.01)

(52) U.S. Cl.
CPC .............. *A47J 43/28* (2013.01); *A47G 21/02* (2013.01)

(58) Field of Classification Search
CPC .. A47J 43/28; A47J 45/06; A47J 45/08; A47J 36/025; A47G 21/02; A47G 21/023; A47G 21/10
USPC ............................ 30/142, 147, 150, 322–323
See application file for complete search history.

(56) References Cited

U.S. PATENT DOCUMENTS

| 865,620 | A | * | 9/1907 | Vasconcelles | A47G 21/02 30/322 |
| 1,527,007 | A | * | 2/1925 | Ott | A47J 43/28 15/228 |
| 1,809,254 | A | * | 6/1931 | Smith | A47G 21/02 30/322 |
| 2,775,520 | A | * | 12/1956 | Bloom et al. | A47G 21/02 420/60 |
| 4,038,234 | A | | 7/1977 | Birchall et al. | |
| 4,043,966 | A | | 8/1977 | Edwards et al. | |
| 4,104,225 | A | | 8/1978 | Conbere | |
| 4,361,622 | A | | 11/1982 | Theisen et al. | |
| 4,521,356 | A | * | 6/1985 | Keller et al. | A47G 21/02 D7/653 |
| 4,643,164 | A | | 2/1987 | LaForge | |
| 5,044,265 | A | | 9/1991 | Janssen | |
| 5,643,485 | A | | 7/1997 | Potter et al. | |

(Continued)

OTHER PUBLICATIONS

High Temperature Safety—University of Wisconsin—Madison—Engineering Physics Department https://safety.ep.wisc.edu/hazards/hiqh-temperature-safety.

(Continued)

*Primary Examiner* — Jason Daniel Prone
(74) *Attorney, Agent, or Firm* — Lesavich High-Tech Law Group, S.C.; Stephen Lesavich

(57) ABSTRACT

A heat resistance cooking apparatus. The heat resistance cooking apparatus including a cooking section, a handle section and a middle section coated with acrylic elastomeric compound providing: (1) an insulating thermal coating reducing heat absorption on the coated middle section from the cooking section that is placed in contact with a cooking heat source such as stove, grill, camp fire, fire pit, etc., (2) resistance to cracking including a flexible surface layer expandable and contractible with changes in temperature, (3) resistance to thermal shock; (4) water resistance, (5) fade resistance, (6) providing a textured surface on the middle section for easy, non-slip gripping, and (7) dishwasher safe.

20 Claims, 7 Drawing Sheets

(56) References Cited

U.S. PATENT DOCUMENTS

| | | | |
|---|---|---|---|
| 5,860,190 A * | 1/1999 | Cano | A47G 21/02 30/322 |
| 5,975,909 A * | 11/1999 | Ritchie | A47G 21/02 30/322 |
| 6,807,962 B2 | 10/2004 | Taplan et al. | |
| 6,865,815 B1 | 3/2005 | Dunn et al. | |
| 8,463,765 B2 | 6/2013 | Lesavich | |
| 8,602,248 B2 | 12/2013 | Mathieu | |
| 9,037,564 B2 | 5/2015 | Lesavich et al. | |
| 9,137,250 B2 | 9/2015 | Lesavich et al. | |
| 9,273,269 B2 | 3/2016 | Parte et al. | |
| 9,361,479 B2 | 6/2016 | Lesavich et al. | |
| 9,569,771 B2 | 2/2017 | Lesavich et al. | |
| 9,708,434 B2 | 7/2017 | Mays et al. | |
| 10,071,419 B2 | 9/2018 | Tomonari et al. | |
| 10,123,656 B2 | 11/2018 | Shanmugam | |
| 10,716,425 B2 | 7/2020 | Allemand et al. | |
| 2004/0226456 A1 | 11/2004 | Kim | |
| 2005/0084580 A1 | 4/2005 | Jones et al. | |
| 2005/0112414 A1 | 5/2005 | El-Raghy et al. | |
| 2005/0241497 A1 * | 11/2005 | Cantu | A47J 43/28 99/494 |
| 2011/0155432 A1 | 6/2011 | Tomonari et al. | |
| 2011/0208710 A1 | 8/2011 | Lesavich | |
| 2012/0152962 A1 * | 6/2012 | Arbuckle | A47J 43/28 30/322 |
| 2012/0278622 A1 | 11/2012 | Lesavich et al. | |
| 2014/0189792 A1 | 7/2014 | Lesavich et al. | |
| 2015/0335204 A1 | 11/2015 | Palmer et al. | |
| 2015/0379301 A1 | 12/2015 | Lesavich et al. | |
| 2016/0321654 A1 | 11/2016 | Lesavich et al. | |
| 2016/0331174 A1 | 11/2016 | Allemand et al. | |
| 2017/0071401 A1 | 3/2017 | Fang et al. | |
| 2018/0142896 A1 | 5/2018 | Jacobs | |

OTHER PUBLICATIONS

National Burn Repository—2019 Update—American Burn Association https://sk75w2kudid3fv2xs2cwmrg-wpengine.netdna-ssi.com/wp-content/uploads/2020/05/2019-ABA-Annual-Report_FINAL.pdf.

Fire Dynamics—NIST—https//www.nist.gov/el/fire-research-division-73300/firegov-fire-service/fire-dynamics.

* cited by examiner

HEAT RESISTANT COOKING APPARATUS

CROSS REFERENCE TO RELATED APPLICATIONS

This U.S. Utility patent application claims priority to U.S. Provisional patent application 63/204,822, filed on Oct. 27, 2020, the contents of which are incorporated by reference.

FIELD OF INVENTION

This application relates to cooking apparatus for stoves, grills and campfires. More specifically, it relates to a heat resistant cooking apparatus.

BACKGROUND OF THE INVENTION

There are many types of metal cooking apparatus that are used on stoves, grills, in campfires, etc. When such metal cooking apparatus come in contact with a heat source such as an electric burner, a gas burner, an actual fire in a campfire, the metal heats up.

The temperature of a metal cooking apparatus can actually become hot enough to cause minor injuries up to severe injuries to a person touching it, in the form of thermal burns. Thermal burns occur when hot metals, scalding liquids, steam, or flames come in contact with the skin of a human.

Thermal burns includes first, second or third degree burns. First-degree burns, called superficial burns, cause pain and reddening of the epidermis (i.e., an outer layer of the skin) Second-degree burns, called, partial thickness burns, affect the epidermis and the dermis (i.e., a lower layer of skin). They cause pain, redness, swelling, and blistering. Third-degree burns, called full thickness burns go through the dermis and affect deeper tissues. They result in white or blackened, charred skin that may be numb.

According to the National Institute for Standards and Technology (NIST), human skin begins to feel pain at a temperature of about 111 degrees)(° Fahrenheit (F) (43° (Celsius). At about 118° F. (48° C.) human skin sustains first-degree burns. A second-degree burn injury typically occurs at a temperature of about 131° F. (55° C.) on human skin.

According to the University of Wisconsin Engineering Physics Department—Laboratory and Workplace Safety—High Temperature Safety Publication, third degree thermal burns occur in humans when hot metals come in contact with the skin of humans in about fifteen seconds at 133° F. (56° C.), in about five seconds at 140° F. (60° C.), in about two seconds at 149° F. (65° C.) and in about one second at 156° F. (69° C.).

According to the National Burn Repository, fire causes about 50% of all cases of thermal burns in the United States. The color of a fire is a rough gauge of how hot it is. Deep red fire is about 1112-1800° F. (600-800° C.), orange-yellow fire is about 2012° F. (1100° C.), and a white flame is hottest, ranging from about 2400-2700° F. (1300-1500° C.).

There are many problems associated with cooking utensils. Most cooking utensils are made from metal. As a result, when they are exposed to a heat source they become hot, very quickly and can quickly cause thermal burns.

One problem is that, when metal on a metal cooking utensil comes in contact with a heat source on a kitchen stove, it becomes very hot, very quickly and can quickly cause thermal burns.

Another problem is that when metal on a metal cooking utensil comes in contact with a heat source in on a grill, it becomes very hot, very quickly and can quickly cause thermal burns.

Another problem is that when metal on a metal cooking utensil or a marshmallow fork comes in contact with a heat source in a camp fire, it becomes very hot, very quickly and can quickly cause thermal burns.

In all such instances, it is difficult to remove food items or desert items such as marshmallows, etc. without suffering from thermal burns.

In many instances, accidental thermal burns also occur because the user touches a component of the cooking utensil, such as a shaft or handle that has also become very hot from exposure to the heat source.

There have been some attempts to solve some of the problems associated with such cooking utensils.

One solution is to put a handle on the cooking utensil that is not a conductor of heat such as wood, plastic, etc. However, such a solution does not solve the problem of suffering from thermal burns by touching a shaft or end piece (e.g., fork, metal points, etc.) of the cooking utensil while removing the food or desert items.

Another solution is to make a cooking utensil with just a metal end and a handle and shaft made of non-metal materials. However, such a solution results in a cooking utensil that is difficult to clean (e.g., wood, etc.), may not be useable at higher temperatures as it may burn itself (e.g., wood, plastic, etc.), may melt (e.g., plastic, etc.) or become weak, which may also cause thermal burns or other injuries from the failure of such materials.

Another solution is to create a cooking utensil made out of a substance other than metal that does not conduct heat at all (e.g., wood, plastic, etc.). However, such a solution also may not be useable at higher temperatures as it may burn itself (e.g., wood, plastic, etc.), may melt (e.g., plastic, etc.) or become weak, which may also cause thermal burns or other injuries from the failure of such materials.

These solutions still do not solve all of the problems associated with metal cooking apparatus. Thus, it is desirable to solve some of the problems associated with metal cooking apparatus.

SUMMARY OF THE INVENTION

In accordance with preferred embodiments of the present invention, some of the problems associated with metal cooking apparatus are overcome. A heat resistant cooking apparatus is presented.

The heat resistance cooking apparatus, including a cooking section, a handle section and a middle section coated with acrylic elastomeric compound providing: (1) an insulating thermal coating reducing heat absorption on the coated middle section from the cooking section that is placed in contact with a cooking heat source such as stove, grill, camp fire, fire pit, etc., (2) resistance to cracking including a surface layer expandable and contractible with changes in temperature, (3) resistance to thermal shock; (4) water resistance, (5) fade resistance, (6) providing a textured surface on the middle section for easy, non-slip gripping, and (7) dishwasher safe.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Heat Resistant Cooking Apparatus

Figure 1:
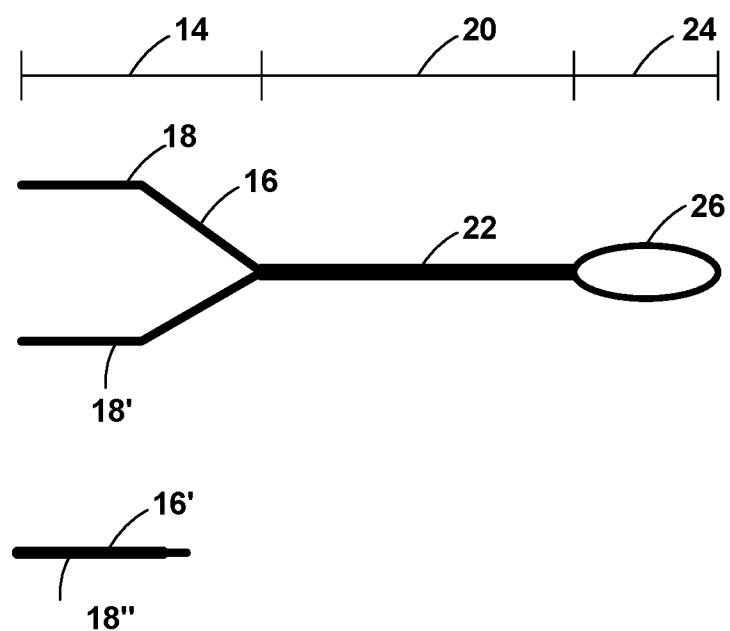
FIG. 1 is a block diagram illustrating an exemplary heat resistant cooking apparatus.

FIG. 1 is a block diagram 10 illustrating an exemplary heat resistant cooking apparatus 12.

The exemplary heat resistant cooking apparatus 12, including but not limited to a first section 14 including a first end comprising a forked component 16 with one or more forked tines 18, 18' (only two of which are illustrated for simplicity) or a component 16', with single tine 18". The one or more forked tines 18, 18', and single tine 18", include, but are not limited to, forked tines for use in kitchens, on grills, in campfires, etc. for cooking foods (e.g., meats, poultry, fish, vegetables, flaming, foods, etc.) and deserts (e.g., marshmallows, smores, flaming deserts, etc.).

For the example, the forked tines 18, 18' and single tines 18", are used to secure various types of meats, poultry, fish and vegetables as a forking apparatus in a kitchen, on a grill and/or on a campfire, is used to secure meats, poultry, fish and vegetables as a kabob skewer, on a grill and/or on a campfire, is used for securing marshmallows, smores, hot dogs, etc. as a marshmallow stick on a campfire, is used for secure meats, cheese, chocolate, etc. on forking apparatus for use with a fondue apparatus, etc. However, the present invention is not limited to such embodiments and other embodiments may be used to practice the invention.

In one embodiment, the first section 14 including the forked component 16 or single tine 18" component 16' comprises a steel, stainless steel, aluminum, brass, bronze, copper, iron, ceramic, clay, natural rock or stone, (e.g., granite, etc.) or synthetic rock or stone, wood, bamboo wood, and/or other material. However, the present invention is not limited to these materials and other materials can be used to practice the invention.

In one embodiment, the second section 20 comprises a steel, stainless steel, aluminum, brass, bronze, copper, iron, ceramic, clay, natural rock or stone, (e.g., granite, etc.) or synthetic rock or stone, wood, bamboo wood, composite material, and/or other material. However, the present invention is not limited to these materials and other materials can be used to practice the invention.

A "composite material" is a material which is produced from two or more constituent materials. These constituent materials have notably dissimilar chemical or physical properties and are merged to create a material with properties unlike the individual elements.

The second section 20 is coated with an acrylic elastomeric compound 22 providing: (1) an insulating thermal coating reducing heat absorption to and from the second section, (2) a flexible surface resistant to cracking including a surface layer expandable and contractible with changes in temperature, (3) resistant to thermal shock; (4) water resistant, (5) fade resistant, (6) providing a textured surface on the second section for easy gripping, (7) cracking resistant, and (8) dishwasher safe. However, the present invention is not limited to such an embodiment, and the second section 20 can be coated with other compounds resistant to heat transfer and with other characteristics.

An "acrylic" is a resin type made from polymers of acrylic acid and or acrylates. Acrylates are the salts, esters, and conjugate bases of acrylic acid. The acrylate ion is the anion, with chemical formula ($CH_2$=$CHCOO^-$). Often, acrylate refers to esters of acrylic acid, the most common member being methyl acrylate.

An "elastomer" is a polymer with viscoelasticity (i.e., both viscosity and elasticity). The term, elastic polymer is often used interchangeably with rubber. The International Union of Pure and Applied Chemistry (IUPAC) defines the term "elastomer" as "a polymer that displays rubber-like elasticity."

In one exemplary embodiment, the acrylic elastomeric compound 22 includes, but is not limited to, up to about 10.1 percent Titanium Dioxide ($TiO_2$), up to about 17.8 percent Calcium Carbonate ($CaCO_3$), at least 10 percent Sodium bentonite ($Al_2H_2Na_2O_{13}Si_4$) and at least 25 percent insulating ceramic microspheres. The remaining percentage of the acrylic elastomeric compound 22 comprises a supporting inert material liquid substrate. The acrylic elastomeric compound 22 is non-toxic after it is applied and can come in contact with food substances. However, the present invention is not limited to such an embodiment, and more, fewer and other compounds and other percentages of the individual components can be used to practice the invention.

Titanium dioxide, also known as titanium (IV) oxide or titania, is a naturally occurring oxide of titanium, with chemical formula ($TiO_2$). When used as a pigment, it is called titanium white, Pigment White 6, or CI 77891. Generally, it is sourced from ilmenite, rutile, and anatase. Titanium dioxide has a number of unique characteristics including an extremely high melting point of about 3,349° F. (1,843° C.) and boiling point of about 5,318° F. (2,972° C.). Titanium dioxide is also a thermal insulator.

A "thermal insulator" is something that prevents heat from moving from one place to another. There are three main ways that heat can travel: convection, conduction, and radiation. Typically the phrase "thermal insulator" refers to a material that blocks thermal "conduction."

"Thermal conduction" is the transfer of internal energy by microscopic collisions of particles and movement of electrons within a body. The colliding particles, which include molecules, atoms and electrons, transfer disorganized microscopic kinetic and potential energy, jointly known as internal energy.

Calcium carbonate, with chemical formula ($CaCO_3$), is, naturally occurring inorganic biomaterial. Besides an amorphous form, $CaCO_3$ is known to crystallize in three polymorphic modifications, calcite, aragonite and vaterite. Of these, calcite is typically the thermodynamically stable phase.

Sodium bentonite, with chemical formula ($Al_2H_2Na_2O_{13}Si_4$), absorbs water, expands when wet and is used as a sealant, since it provides a self-sealing, low permeability barrier.

In one embodiment, the Sodium bentonite is included within Bentonite clays. However, the present invention is not limited to such an embodiment and other embodiments can be used to practice the invention.

Bentonite clay is an absorbent swelling clay comprising mostly of montmorillonite. Montmorillonites are a very soft phyllosilicate group of minerals that form when they precipitate from water solution as microscopic crystals, known as a clay. "Clays" include hydrous aluminum phyllosilicates, sometimes with variable amounts of iron, magnesium, alkali metals, alkaline earths, and other cations found on or near some planetary surfaces. Bentonite clay has the ability to absorb large quantities of water, which increases its volume by up to a factor of eight, also providing a self-sealing, low-permeability barrier.

Sodium bentonite and/or Bentonite clays make a material more "plastic" and flexible, so it can be stretched without cracking. Bentonite clay is also a thermal insulator.

In one embodiment, the Bentonite clays and/or the insulating ceramic microspheres the help provide a textured surface on the second section 20 for easy gripping and the prevention of slipping.

A "ceramic" is any of a various hard, brittle, heat-resistant and corrosion-resistant materials made by shaping and then firing a nonmetallic mineral, such as a clay, at a high temperature.

"Microspheres" are small spherical particles, with diameters in the micrometer range (typically 1 μm (micro-meters, $10^{-6}$ m) to 1000 μm (1 mm)). Microspheres are sometimes referred to as spherical micro-particles. In general microspheres are solid or hollow and do not have a fluid inside, as opposed to microcapsules.

The insulating ceramic microspheres are a thermal insulator that form a tight interlocking ceramic barrier matrix which reduces conductive heat through a coated surface 22. The ceramic barrier matrix dissipates heat rapidly preventing heat transfer and reflects up to 90% of heat received back to a heat source. The insulating ceramic microspheres have a thermal conductivity of about 0.1 Watt/m/° C.

"Thermal shock" is a type of rapidly transient mechanical load. By definition, it is a mechanical load caused by a rapid change of temperature at a certain point. It is also extended to a thermal gradient, which makes different parts of an object expand by different amounts. The differential expansion causes weakness and eventually failures in an object on different parts of an object.

The acrylic elastomeric compound 22 is also mildew and fade resistant with exposure to Ultraviolet (UV) light from sunlight and other light sources. "Mildew" is a form of fungus and has been identified as a cause of certain human ailments. "Mold" is a fungus that grows in the form of multicellular filaments called hyphae has also been identified as a cause of certain human ailments Ultraviolet (UV) light is a form of electromagnetic radiation with wavelength from 10 nanometers ($1 \times 10^{-9}$ meters). "Ultraviolet" rays from the sun are one of the causes of fading because they can break down chemical bonds and fade the color in an object.

In one specific embodiment of the invention, for example, the acrylic elastomeric compound 22, includes, but is not limited to, using RC #233, INSULATING, THERMAL COATING, a commercial product sold by HY-TECH THERMAL SOLUTIONS, LLC, of Melbourne, Honda US. This commercial product has a similar chemical makeup, but not an identical chemical makeup, as the claimed invention described herein. However, the present invention is not limited to this specific compound and other compounds claimed herein and/or sold by other companies can be used to practice the invention.

It has been determined experimentally, in one specific embodiment of the invention, the acrylic elastomeric compound 22, includes, but is not limited to, a coating of about 0.11 inches to 0.98 inches (about 3-7 mm) in thickness. In one embodiment, a single coat of the acrylic elastomeric compound 22 is applied. In another embodiment, plural coats of the acrylic elastomeric compound 22 are applied to provide additional heat insolation protection. However, the present invention is not limited to these embodiments, and other coating compounds and other numbers of coatings of other coating thicknesses can be used to practice the invention.

It has been determined experimentally, with the first section 14 and the second section 20 both being a metal component comprising a same material, steel, that heating the first section 14 to a red hot state, (e.g., above about 752° F. (460° C.), glowing with a red color, etc.), which is outside an operational safety zone for the heat resistant cooking apparatus 12, the acrylic elastomeric compound 22 applied to the second section 20 does not allow the second section 20 to conduct the heat in an outward manner. Thus, the second section 20 coated with the acrylic elastomeric compound 22 can still be safely touched with a human hand and the human hand will not experience a thermal burn even though it feels warm and/or hot to the touch. However, the present invention is not limited to this embodiment, and other embodiments can be used to practice the invention.

In one embodiment, the acrylic elastomeric compound 22 is white in color. The acrylic elastomeric compound 22 can also be tinted to a desired color of choice by adding an appropriate colored dye to it. In such an embodiment, the acrylic elastomeric compound 22 on heat resistant cooking apparatus 12 is produced with a desired color including the desired tinting dye. However, the present invention is not limited to this embodiment, and other embodiments can be used to practice the invention.

FIG. 1 is described as having three separate sections 14, 20 and 24, to illustrate the functionality of the invention. In one embodiment, the heat resistant cooking apparatus 12 is created from a single piece of material and the three sections 14, 20 and 24 are all integral on the single piece of material. In another embodiment, the heat resistant cooking apparatus 12 is created from plural pieces of material that are connected together at plural connection points. However, the present invention is not limited to these embodiments, and other embodiments, and other combinations of pieces and components can be used to practice the invention.

Figure 6:
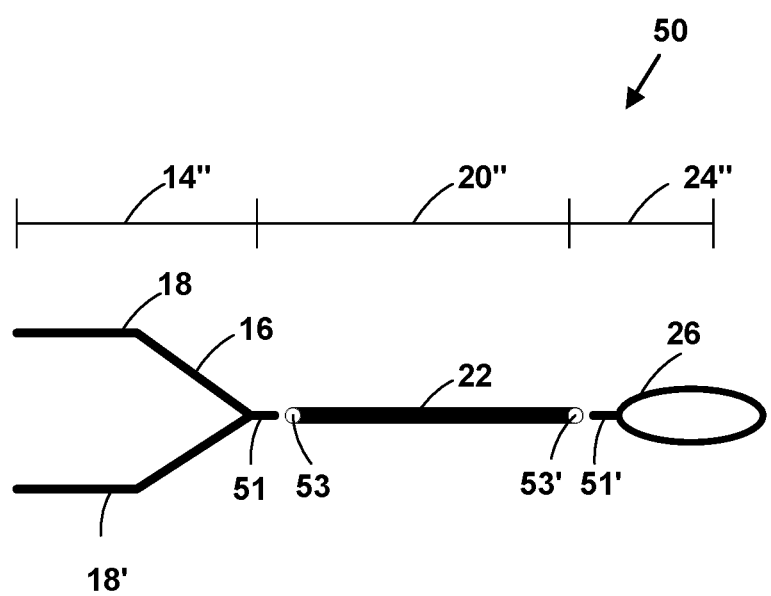
FIG. 6 is a block diagram illustrating an exemplary heat resistant cooking apparatus.

In another embodiment, the heat resistant cooking apparatus 12 is created from three separate pieces of material, one for each of the three separate sections 14", 20", 24" (See FIG. 6). However, the present invention is not limited to these embodiments, and other embodiments, and other combinations of pieces and components can be used to practice the invention.

Figure 2:
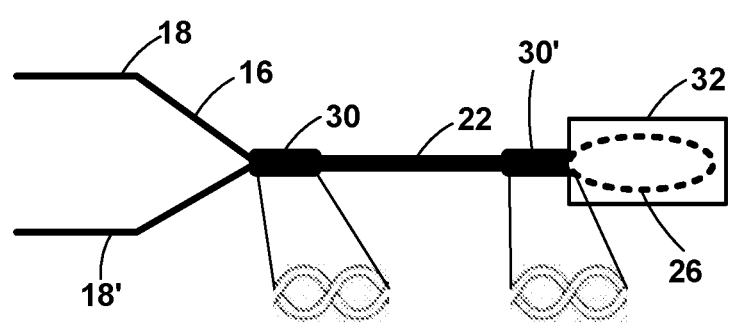
FIG. 2 is a block diagram illustrating an exemplary heat resistant cooking apparatus.

FIG. 2 is a block diagram 28 illustrating an exemplary heat resistant cooking apparatus 12.

FIG. 2 illustrates the first 14, second 20 and third 24 sections created from a single piece of material (e.g., a single piece of metal, etc.) bent and twisted with a mechanical machines (e.g., similar to twisting required for creating a metal coat hanger, etc.) into a desired, pre-determined shape. FIG. 2 illustrates a cooking fork with two tines 18, 18' with only two twisted sections 30, 30' for simplicity. FIG. 2 illustrates an embodiment with two twists each. However, the present invention is not limited to such an embodiment and the present invention can be practiced with one twist up to any other number of desired twists.

In one specific embodiment, the cooking fork is about 20 inches (about 50.8 cm) to about 32 inches (about 81.3 cm) in length. However, the present invention is not limited to such embodiments and the present invention can be practiced with cooking forks of other lengths.

In one specific embodiment, the pre-determined shape includes but is not limited to, a cooking fork, kabob skewer, a marshmallow stick, a fondue fork, and/or type of cooking utensil that is used in an environment where a heat source and/or a fire issued. However, the present invention is not limited to such embodiments and other embodiments may be used to practice the invention.

In one specific embodiment, the acrylic elastomeric compound 22 is used to coat only the second section 20. However, the present invention is not limited to such an embodiment and other embodiments and coating of other surfaces can be used to practice the invention.

In one specific embodiment, the acrylic elastomeric compound 22 is used to coat both the second 20 section and the third 24 section. However, the present invention is not limited to such an embodiment and other embodiments and coating of other surfaces can be used to practice the invention.

The third section 24 comprises a handle component 26. In one embodiment, the third section 24 includes a handle covering component 32 comprising a thermal insulator material (e.g., wood, plastic, composite material, etc.). FIG. 2 illustrates the handle covering component 32 as a rectangular shape. However, the present invention is not limited to such an embodiment and other shapes, other types of covering materials and other embodiments may be used to practice the invention.

Figure 3:
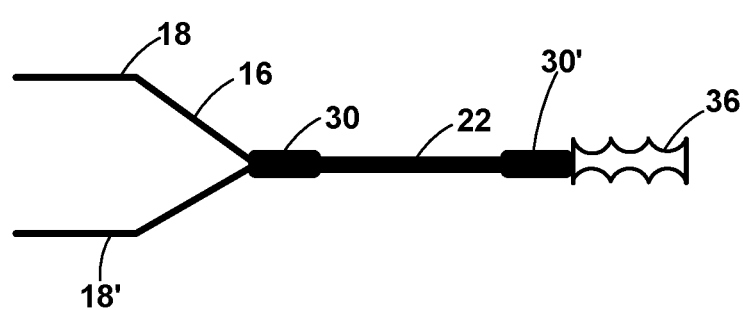
FIG. 3 is a block diagram illustrating an exemplary heat resistant cooking apparatus.

FIG. 3 is a block diagram 34 illustrating an exemplary heat resistant cooking apparatus 12.

In one embodiment, the handle component 26 includes an additional covering component, including, but not limited to, an ergonomic gripping cover component 36, to make the heat resistant cooking apparatus 12 easier, to grip and hold. In one embodiment, the ergonomic gripping cover component 36 includes a soft plastic, rubber, silicon and/or other soft gripping material. However, the present invention is not limited to such an embodiment and other embodiments can be use used to practice the invention.

"Ergonomics" is the process of designing products so that they fit the people who use them. Ergonomics aims to products to minimize risk of injury or harm to users. Ergonomics aims to create safe, comfortable and productive products by bringing human abilities and limitations into the design of a product, including the individual's body size, strength, grip, skill, speed, sensory abilities, etc.

The third section 24 is illustrated as a hollow component with an oval shape 26 in the FIGS. 1, 2 and 4-7. However, the present invention is not limited to such an embodiment and other shapes and other covering components and other shaped covering components can be used to practice the invention.

Figure 4:
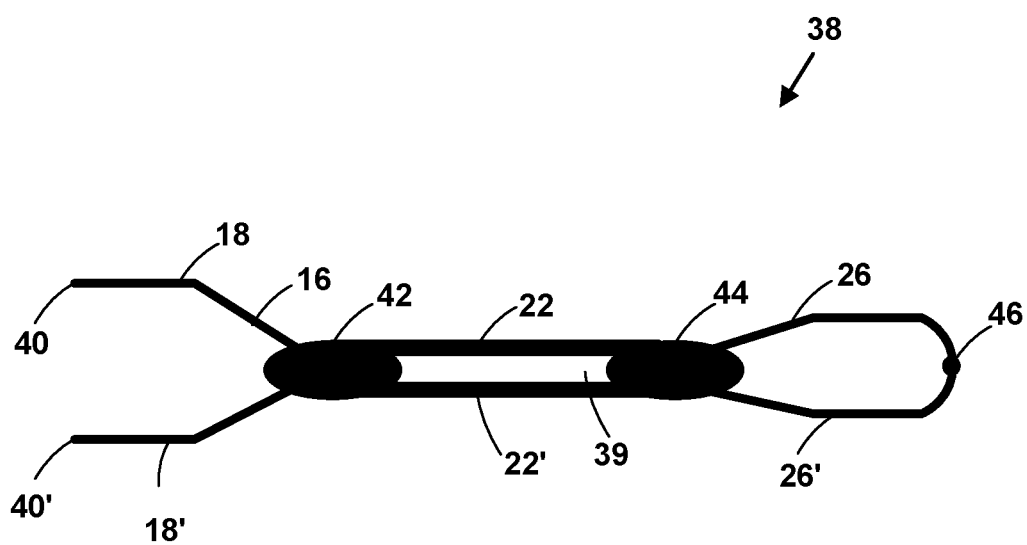
FIG. 4 is a block diagram illustrating an exemplary heat resistant cooking apparatus.

FIG. 4 is a block diagram 40 illustrating an exemplary heat resistant cooking apparatus 12.

FIG. 4 illustrates the heat resistant cooking apparatus 12 created with two separate pieces of material 40, 40' connected at a first connection 42 point between the first section 14 and the second section 20, at a second connection point 44 connected between the second section 20 and the third section 24 and at a third connection point 46 connecting two separate pieces of the third section 24. In FIG. 4, only the two second sections 20, 20' are coated with the acrylic elastomeric compound 22. However, the present invention is not limited to such an embodiment, and other embodiments can be used to practice the invention and the acrylic elastomeric compound 22 can be used to coat other sections and components of the heat resistant cooking apparatus 12.

In one embodiment, the first connection point 42 second 44 and third 46 connection points comprise a welded connection component. However, the present invention is not limited to such an embodiment and other connection means can be used to practice the invention.

Welded connections are connections whose components are joined together primarily by welds. Welds can be classified according to: (1) types of welds comprising groove, fillet, plug, and slot welds; and (2) positions of the welds comprising horizontal, vertical, overhead, and flat welds.

In one embodiment, the first connection point 42 second 44 and third 46 connection points comprise a fastening connection component (e.g., bolt, screw, pin, nail, etc.). However, the present invention is not limited to such an embodiment and other connection means can be used to practice the invention.

In one embodiment, the two separate pieces of material 40 (18, 22, 26), 40' (18', 22', 26') are connected by aligning the two separate pieces of material 40, 40' to touch in three places. The acrylic elastomeric compound 22 is applied to the first connection point 42 second 44 and third 46 connection points comprise to connect the two separate pieces of material 40, 40' using acrylic elastomeric compound 22 connection component points. However, the present invention is not limited to such an embodiment and other connection means can be used to practice the invention.

In another embodiment, the two separate pieces of material 40, 40' are connected by combinations of the connecting techniques described herein and/or with combinations of other connection techniques and/or other types of connection means.

FIG. 4 also illustrates an embodiment of the exemplary heat resistant cooking apparatus 12 with a hollow center 39 providing additional gripping surfaces coated with the acrylic elastomeric compound 22. However, the present invention is not limited to such an embodiment and other embodiments can be used to practice the invention.

Figure 5:
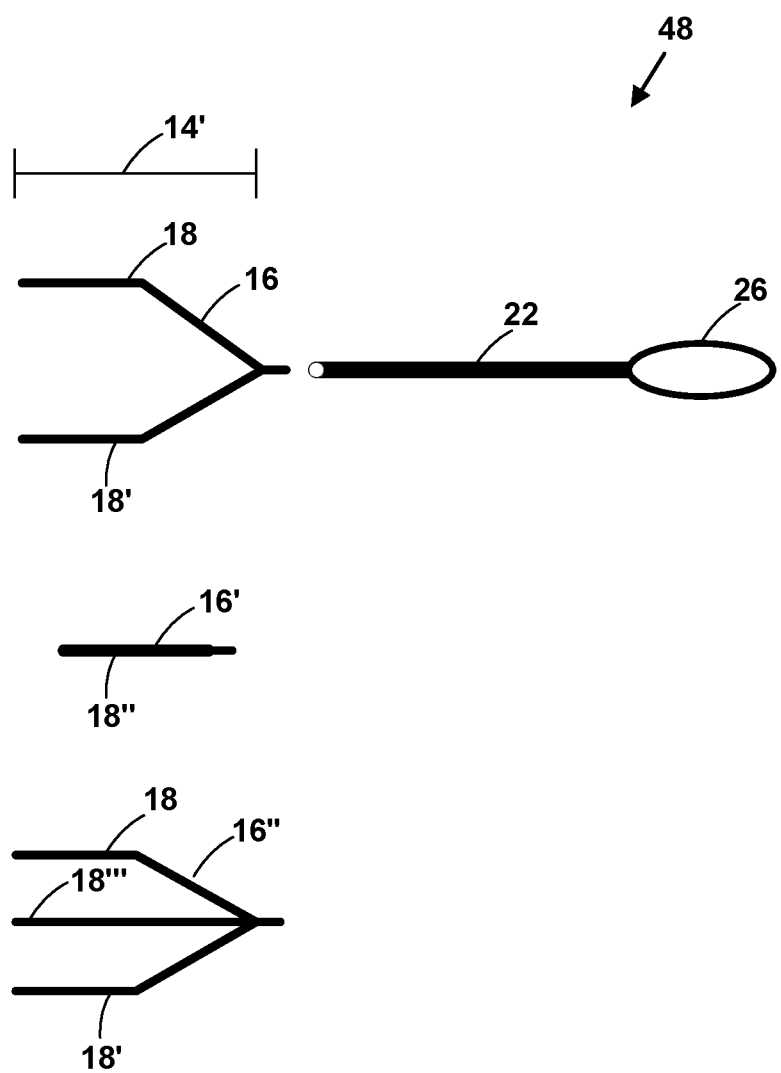
FIG. 5 is a block diagram illustrating an exemplary heat resistant cooking apparatus.

FIG. 5 is a block diagram 48 illustrating an exemplary heat resistant cooking apparatus 12.

In another embodiment, the heat resistant cooking apparatus 12 further comprises a first section 14' that is removable and insertable to change a cooking functionality of the first section 14. For example, the first section may be changed from forked component 16 with two tines 18, 18' to a forked component 16" with three tines 18, 18', 18''', and/or change to a forked component 16' with a single tine 18''', etc., changed to a spoon and/or other type of cooking utensil, etc. However, the present invention is not limited to such an embodiment and other embodiments can be used to practice the invention.

In another embodiment, the heat resistant cooking apparatus 12 further comprises a hollow first 14, second 20 and third 24 section. In another embodiment, the first 14, second 20 and third 24 section comprises a combination of solid and hollow components. However, the present invention is not limited to such an embodiment and other embodiments can be used to practice the invention.

In another embodiment, the heat resistant cooking apparatus 12 further comprises a first section 14 that is removable and insertable to change a cooking functionality of the first section 14 to, including but not limited to, a medical, industrial, and/or other type of functionality to provide an another apparatus 12 that requires use in an environment where a heat source and/or fire source is used.

FIG. 6 is a block diagram 50 illustrating an exemplary heat resistant cooking apparatus 12.

In FIG. 6, the heat resistant cooking apparatus 12 is created from three separate pieces of material, one for each of the three separate sections 14", 20", 24". In one embodiment, the three separate sections 14", 20", 24" are dynamically insertable and removable from each other. In another embodiment, the three separate sections 14", 20", 24" are permanently connected to each other. However, the present invention is not limited to such an embodiment and other embodiments can be used to practice the invention.

In one embodiment, the first section 14" and third section 24" include a threaded component 51, 51' that is rotated into the second section 20" that includes a threaded receptacle 53 on a first end and on a second end 53' to accept the threaded components 51, 51'. In another embodiment, the second section 20" includes a non-threaded receptacle coated with plastic, rubber, etc. for accepting and holding the first section 14" and the third section 24" with a friction connection. In another embodiment, the first section 14" and the third section 24" are welded to the second section 20" and/or connected with other connection means (e.g., bolt, pin, screw, nail etc.) and/or with connections created with the acrylic elastomeric compound 22. In another embodiment, the first section 14" and the third section 24" are connected to the second section 20" by combinations of the connecting techniques described herein and/or with combinations of other connection techniques and/or other types of connection means and other embodiments can be used to practice the invention.

Figure 7:
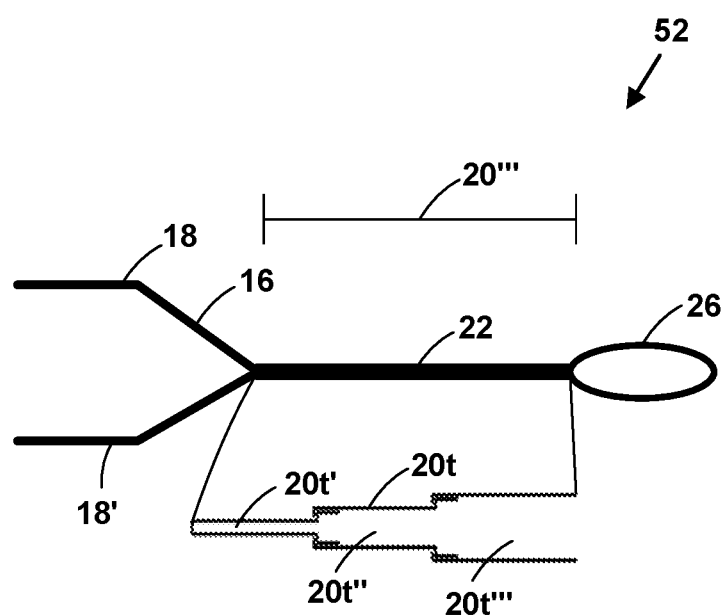
FIG. 7 is a block diagram illustrating an exemplary heat resistant cooking apparatus.

FIG. 7 is a block diagram 52 illustrating an exemplary heat resistant cooking apparatus 12.

In FIG. 7, the exemplary heat resistant cooking apparatus 12, includes a telescopic 20t second section 20'" in which plural portions 20t', 20t," 20t'" of the second section 20t slide into and out of each other. FIG. 7 illustrates a side view (not drawn to scale) of the telescopic second section 20t with three telescopic sections in an open or expanded configuration. However, the present invention is not limited to three telescopic sections and more and/or fewer telescopic sections can also be used to practice the invention.

In such an embodiment, each of the plural telescopic portions 20t', 20t," 20t'" are coated with the acrylic elastomeric compound 22. In such an embodiment, the telescopic second section 20t allows easier transport and storage of the heat resistant cooking apparatus 12. In such an embodiment, the heat resistance cooking apparatus 12 can more easily fit in a drawer, in a backpack during a camping trip, in a vehicle such as a car, truck, camper, motorcycle, boat, etc. However, the present invention is not limited to such an embodiment and other embodiments can be used to practice the invention.

A heat resistance cooking apparatus 12 is presented herein. The heat resistance cooking apparatus 12 including a cooking section 14, a handle section 24 and a middle section 20 coated with acrylic elastomeric compound 22 providing: (1) an insulating thermal coating reducing heat absorption on the coated 22 middle section 20 from the cooking section 14 that is placed in contact with a cooking heat source such as stove, grill, camp fire, fire pit, etc., (2) resistance to cracking including a flexible surface layer expandable and contractible with changes in temperature, (3) resistance to thermal shock; (4) water resistance, (5) fade resistance, (6) providing a textured surface on the middle section 20 for easy, non-slip gripping, and (7) dishwasher safe.

It should be understood that the architecture, programs, processes, methods and systems described herein are not related or limited to any particular type of specific component or material unless indicated otherwise. Various types of components and materials may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in specific materials, in other embodiments other materials and implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A heat resistant cooking apparatus, comprising in combination:
    a first section including a first end comprising a forked component with one or more tines;
    a second section coated with an acrylic elastomeric compound providing: (1) an insulating thermal coating reducing heat absorption from the first section, (2) resistant to cracking including a flexible surface layer expandable and contractible with changes in temperature, (3) resistant to thermal shock; (4) water resistant, (5) fade resistant, (6) providing a textured surface on the second section for easy gripping, and (7) dishwasher safe; and
    a third section comprising a handle component for gripping and holding the heat resistant cooking apparatus, wherein the first, second and third sections are integral on a single piece of material bent and twisted into a desired pre-determined shape.

2. The heat resistant cooking apparatus of claim 1 wherein the first section including the forked component comprises a steel, stainless steel, aluminum, brass, bronze, copper, iron, ceramic, clay, natural or synthetic rock, wood or bamboo wood material.

3. The heat resistant cooking apparatus of claim 1 wherein the acrylic elastomeric compound includes: (1) up to about 10.1 percent Titanium Dioxide $TiO_2$, (2) up to about 17.8 percent Calcium Carbonate $CaCO_3$, (3) at least about 10 percent Sodium Bentonite $Al_2H_2Na_2O_{13}Si_4$ and (4) at least about 25 percent insulating ceramic microspheres.

4. The heat resistant cooking apparatus of claim 1 wherein the second section comprises a steel, stainless steel, aluminum, brass, bronze, copper, iron, ceramic, clay, natural or synthetic rock, composite material wood or bamboo wood, material.

5. The heat resistant cooking apparatus of claim 1 wherein the first and second section comprise an identical material.

6. The heat resistant cooking apparatus of claim 1 wherein the first, second and third sections comprise an identical material.

7. The heat resistant cooking apparatus of claim 1 wherein the pre-determined shape includes a cooking fork, kabob skewer, a marshmallow stick or a fondue fork.

8. The heat resistant cooking apparatus of claim 1 wherein the third section includes a thermal insulator material.

9. The heat resistant cooking apparatus of claim 1 wherein the third section is coated with the acrylic elastomeric compound.

10. The heat resistant cooking apparatus of claim 1 wherein the third section includes a handle covering component comprising a thermal insulator material.

11. The heat resistant cooking apparatus of claim 1 wherein the handle component includes an ergonomic handle component.

12. The heat resistant cooking apparatus of claim 1 connected at a first connection point between the first section and the second section, at a second connection point between the second section and the third section and at a third connection point where the single piece of material is bent and twisted at the first, second and third connection points.

13. The heat resistant cooking apparatus of claim 12 wherein the first, second and third connection points further include a weld connection component, or an acrylic elastomeric compound connection component, or a combination thereof.

14. The heat resistant cooking apparatus of claim 1 further comprising hollow first, second and third section components.

15. The heat resistant cooking apparatus of claim 1 wherein the first section, the second section and the third section and the forked component comprises a steel, stainless steel, aluminum, brass, bronze, copper, iron, ceramic, clay, wood or bamboo wood material.

16. A heat resistant cooking apparatus, comprising in combination:
- a first section including a forked cooking component placed in contact with a cooking heat source;
- a second section coated with an acrylic elastomeric compound providing an insulating thermal coating reducing heat absorption and heat convection from the first section,
- the acrylic elastomeric compound including: (1) up to about 10.1 percent Titanium Dioxide $TiO_2$, (2) up to about 17.8 percent Calcium Carbonate $CaCO_3$, (3) at least about 10 percent Sodium Bentonite $Al_2H_2Na_2O_{13}Si_4$ and (4) at least about 25 percent insulating ceramic microspheres; and
- a third section providing a handle component for gripping and holding the heat resistant cooking apparatus,
- wherein the first, second and third sections are integral on a single piece of material bent and twisted into a desired pre-determined shape.

17. A heat resistant cooking apparatus, comprising in combination:
- a first section including a first end comprising an attachable and removable cooking component for changing a cooking functionality of the first section;
- a telescopic second section including a plurality of telescopic second section components each coated with the acrylic elastomeric compound providing: (1) an insulating thermal coating reducing heat absorption from the first section, (2) resistant to cracking including a flexible surface layer expandable and contractible with changes in temperature, (3) resistant to thermal shock; (4) water resistant, (5) fade resistant, (6) providing a textured surface on the second section for easy gripping, and (7) dishwasher safe; and
- a third section comprising a handle component for gripping and holding the heat resistant cooking apparatus,
- wherein the first section and third sections are bent and twisted into desired pre-determined shapes.

18. A heat resistant apparatus kit, comprising in combination:
- a first section including a plurality of different attachable and removable heat resistant components,
- the plurality of different attachable and removable heat resistant components comprising a plurality of different cooking components, medical components, industrial components, or a combination thereof, for changing a functionality of the first section;
- a second section coated with an acrylic elastomeric compound providing an insulating thermal coating reducing heat absorption and heat convection from the first section,
- the acrylic elastomeric compound including: (1) up to about 10.1 percent Titanium Dioxide $TiO_2$, (2) up to about 17.8 percent Calcium Carbonate $CaCO_3$, (3) at least about 10 percent Sodium Bentonite $Al_2H_2Na_2O_{13}Si_4$ and (4) at least about 25 percent insulating ceramic microspheres; and
- a third section providing a handle component for gripping and holding the heat resistant apparatus.

19. The heat resistant cooking apparatus of claim 18 wherein the plurality of different attachable and removable heat resistant components include a single tine or a plurality of tines.

20. The heat resistant cooking apparatus of claim 18 wherein the plurality of different attachable and removable heat resistant components include a cooking fork, kabob skewer, marshmallow stick or fondue fork.

* * * * *